United States Patent
Hatanaka et al.

(10) Patent No.: US 7,428,003 B2
(45) Date of Patent: Sep. 23, 2008

(54) AUTOMATIC STABILIZATION CONTROL APPARATUS, AUTOMATIC STABILIZATION CONTROL METHOD, AND RECORDING MEDIUM HAVING AUTOMATIC STABILIZATION CONTROL PROGRAM RECORDED THEREON

(75) Inventors: Haruo Hatanaka, Kyoto (JP); Naoki Chiba, Higashi-Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 756 days.

(21) Appl. No.: 10/943,216

(22) Filed: Sep. 17, 2004

(65) Prior Publication Data

US 2005/0093987 A1 May 5, 2005

(30) Foreign Application Priority Data

Sep. 19, 2003 (JP) ............................. 2003-328013

(51) Int. Cl.
*H04N 5/225* (2006.01)
(52) U.S. Cl. .................................. 348/208.1; 348/208.6
(58) Field of Classification Search ............ 348/208.99, 348/208.1, 208.4, 208.6, 208.12, 208.14, 348/699; 382/107
See application file for complete search history.

(56) References Cited

U.S. PATENT DOCUMENTS

| | | | | |
|---|---|---|---|---|
| 5,210,559 | A * | 5/1993 | Ohki ...................... | 348/208.99 |
| 6,456,731 | B1 | 9/2002 | Chiba et al. | |
| 6,628,711 | B1 * | 9/2003 | Mathew et al. ........... | 348/208.6 |
| 6,654,049 | B2 * | 11/2003 | Fletcher et al. .......... | 348/208.6 |
| 2002/0036692 | A1 * | 3/2002 | Okada ...................... | 348/208 |
| 2002/0131498 | A1 | 9/2002 | Sun et al. | |
| 2004/0005084 | A1 * | 1/2004 | Kondo et al. ............. | 382/107 |
| 2005/0057660 | A1 * | 3/2005 | Nonaka et al. .......... | 348/208.99 |
| 2006/0140507 | A1 * | 6/2006 | Ohki ..................... | 348/208.99 |

FOREIGN PATENT DOCUMENTS

| | | |
|---|---|---|
| JP | 3-3571 | 1/1991 |
| JP | 2892685 | 2/1999 |
| JP | 11-339021 | 12/1999 |
| JP | 2002-330443 | 11/2002 |

OTHER PUBLICATIONS

Japanese Office Action, issued in Japanese Patent Application No. 2003-328013, dated on Mar. 14, 2007.

\* cited by examiner

*Primary Examiner*—Lin Ye
*Assistant Examiner*—Jason Whipkey
(74) *Attorney, Agent, or Firm*—McDermott Will & Emery LLP

(57) ABSTRACT

In an automatic stabilization control apparatus that makes automatic stabilization control of data representing a moving image within a range from a reference frame to a frame which is an arbitrary number of frames succeeding the reference frame, an automatic stabilization control apparatus comprises first means for calculating a geometric conversion coefficient between an input frame and a frame which is one frame preceding the input frame for converting coordinates on the input frame into coordinates on the frame which is one frame preceding the input frame as a geometric conversion coefficient between the adjacent frames; second means for accumulating the geometric conversion coefficients between the adjacent frames from the reference frame to the input frame, to calculate an indirect geometric conversion coefficient between the input frame and the reference frame; third means for calculating a direct geometric conversion coefficient between the input frame and the reference frame utilizing the indirect geometric conversion coefficient between the input frame and the reference frame; and fourth means for carrying out automatic stabilization control of the input frame using the direct geometric conversion coefficient between the input frame and the reference frame.

9 Claims, 11 Drawing Sheets

AUTOMATIC STABILIZATION CONTROL APPARATUS, AUTOMATIC STABILIZATION CONTROL METHOD, AND RECORDING MEDIUM HAVING AUTOMATIC STABILIZATION CONTROL PROGRAM RECORDED THEREON

BACKGROUND OF THE INVENTION

1. Field of the Invention

The present invention relates to an automatic stabilization control apparatus, an automatic stabilization control method, and a recording medium having an automatic stabilization control program recorded thereon.

2. Description of the Background Art

Automatic stabilization control apparatuses for carrying out automatic stabilization control of an image picked up by an image pick-up device such as a video camera have been conventionally known. FIG. 1 is a block diagram showing the automatic stabilization control apparatus. The automatic stabilization control apparatus comprises a frame input unit 50, a geometric conversion coefficient calculation unit 51, an automatic stabilization control unit 52, and a frame output unit 53.

The geometric conversion coefficient calculation unit 51 calculates a geometric conversion coefficient utilizing image processing such as matching from a plurality of frames, for example. The automatic stabilization control unit 52 subjects an input frame which is stored in a memory once to geometric conversion using the geometric conversion coefficient calculated by the geometric conversion coefficient calculation unit 51.

The geometric conversion coefficient is represented by a matrix of 3 by 3, as expressed by the following equation (1) and corresponds to a coefficient in world coordinate conversion between two frames.

$$\begin{pmatrix} x' \\ y' \\ 1 \end{pmatrix} = \begin{pmatrix} m_{11} & m_{12} & m_{13} \\ m_{21} & m_{22} & m_{23} \\ 0 & 0 & 1 \end{pmatrix} \begin{pmatrix} x \\ y \\ 1 \end{pmatrix} \quad (1)$$

FIG. 2 shows the procedure for correction processing in a case where a geometric conversion coefficient is calculated using image processing, and an input frame is subjected to geometric conversion to carry out automatic stabilization control.

Let $F_S$ be a start frame (a reference frame), $F_2$ be the current input frame, $F_1$ be an input frame which is one frame preceding the current input frame $F_2$, $M_{12}$ be a geometric conversion coefficient between the frames $F_1$ and $F_2$ (a geometric conversion coefficient for converting coordinates on the frame $F_2$ into coordinates on the frame $F_1$), $M_{S1}$ be a geometric conversion coefficient between the frames $F_S$ and $F_1$, and $M_{S2}$ be an accumulated geometric conversion coefficient between the frames $F_S$ and $F_2$ (an accumulated geometric conversion coefficient for converting coordinates on the frame $F_2$ into coordinates on the frame $F_S$).

Each of the frames from the start frame to the end frame is subjected to the following processing: That is, an output frame memory is cleared (step 100), the frame is read on a work memory, and the read frame (input frame) is taken as $F_2$ (step 101).

It is then judged whether or not the input frame $F_2$ is the start frame $F_S$ (step 102). When it is judged that the input frame $F_2$ is the start frame $F_S$, a coefficient (an initial value) representing non-conversion as expressed by the following equation (2) is set as the accumulated geometric conversion coefficient $M_{S2}$ between the start frame $F_S$ and the input frame $F_2$ (step 103).

$$M = \begin{pmatrix} 1 & 0 & 0 \\ 0 & 1 & 0 \\ 0 & 0 & 1 \end{pmatrix} \quad (2)$$

The input frame $F_2$ is set as the preceding input frame $F_1$, and $M_{S2}$ is set as the geometric conversion coefficient $M_{S1}$ between the start frame $F_S$ and the preceding input frame $F_1$ (step 104). Further, data representing the input frame $F_2$ is rendered as it is in the output frame memory (step 105). Thereafter, the procedure is returned to the step 100. In the step 100, the output frame memory is cleared, and the succeeding frame is read.

When it is judged in the foregoing step 102 that the input frame $F_2$ is not the start frame $F_S$, the geometric conversion coefficient $M_{12}$ between the preceding frame $F_1$ and the current frame $F_2$ is calculated (step 106). The accumulated geometric conversion coefficient $M_{S2}$ between the start frame $F_S$ and the current frame $F_2$ is then calculated from $M_{S1}$ and $M_{12}$, as expressed by the following equation (3) (step 107)

$$M_{S2} = M_{12} M_{S1} \quad (3)$$

The input frame $F_2$ is set as the preceding input frame $F_1$, and $M_{S2}$ is set as the geometric conversion coefficient $M_{S1}$ between the start frame $F_S$ and the preceding input frame $F_1$ (step 108). Further, the input frame $F_2$ is subjected to geometric conversion using the accumulated geometric conversion coefficient $M_{S2}$, and the frame after the geometric conversion is then rendered in the output frame memory (step 109). Thereafter, the procedure is returned to the step 100. In the step 100, the output frame memory is cleared, and the succeeding frame is read.

A typical method of calculating a geometric conversion coefficient between two frames will be described (see JP-A-11-339021). First, a feature point such as an edge is extracted from the one frame. Feature points are then tracked (matched) between the frames, to find a correspondence point on the one frame corresponding to the feature point on the other frame. Two equations such as an equation (4) are obtained from one set of correspondence points (x1, y1) and (x1', y1'), thereby deriving six or more equations by detecting three or more sets of correspondence points. From the equations, a geometric conversion coefficient with unknowns is calculated using a linear solution.

$$x' = m_{11}x + m_{12}y + m_{13} \quad y' = m_{21}x + m_{22}y + m_{23} \quad (4)$$

In the conventional geometric conversion coefficient calculating method, the accumulated geometric conversion coefficient between the start frame $F_S$ and the input frame $F_2$ is calculated by accumulating the geometric conversion coefficients between the adjacent frames from the start frame $F_S$ to the input frame $F_2$. Therefore, as the number of input frames increases, calculation errors of the geometric conversion coefficients between the adjacent frames are accumulated. That is, while a large error is made in calculating the geometric conversion coefficient in the frame intermediate between the start frame and the input frame, the frames succeeding the frame corrected by the erroneous conversion coefficient are corrected.

Furthermore, in the conventional automatic stabilization control method, an area where no rendering is performed (hereinafter referred to as a non-rendering area) occurs in the output frame memory. That is, when a plurality of frames picked up in a state where hands move are frames as shown in FIG. 3, frames obtained by rendering data after geometric conversion representing the frames in the output frame memory are as shown in FIG. 4. An oblique portion in each of the frames shown in FIG. 4 is a non-rendering area.

SUMMARY OF THE INVENTION

An object of the present invention is to provide an automatic stabilization control apparatus capable of finding a geometric conversion coefficient between a reference frame and an input frame with high precision and consequently, allowing high-precision automatic stabilization control to be carried out, an automatic stabilization control method, and a recording medium having an automatic stabilization control program recorded thereon.

Another object of the present invention is to provide an automatic stabilization control apparatus capable of preventing, in a memory area for an output frame storing an image after automatic stabilization control, a non-rendering area from occurring, an automatic stabilization control method, and a recording medium having an automatic stabilization control program recorded thereon.

A further object of the present invention is to provide an automatic stabilization control apparatus capable of preventing, in a memory area for an output frame storing an image after automatic stabilization control, a non-rendering area from occurring, and reducing degradation in the quality of the image with its angle of field held, an automatic stabilization control method, and a recording medium having an automatic stabilization control program recorded thereon.

In an automatic stabilization control apparatus that makes automatic stabilization control of data representing a moving image within a range from a reference frame to a frame which is an arbitrary number of frames succeeding the reference frame, a first automatic stabilization control apparatus according to the present invention is characterized by comprising first means for calculating a geometric conversion coefficient between an input frame and a frame which is one frame preceding the input frame for converting coordinates on the input frame into coordinates on the frame which is one frame preceding the input frame as a geometric conversion coefficient between the adjacent frames; second means for accumulating the geometric conversion coefficients between the adjacent frames from the reference frame to the input frame, to calculate an indirect geometric conversion coefficient between the input frame and the reference frame; third means for calculating a direct geometric conversion coefficient between the input frame and the reference frame utilizing the indirect geometric conversion coefficient between the input frame and the reference frame; and fourth means for carrying out automatic stabilization control of the input frame using the direct geometric conversion coefficient between the input frame and the reference frame.

An example of the third means is one comprising means for finding a plurality of feature points from the input frame, means for finding a correspondence point on the reference frame for each of the feature points, and means for calculating the direct geometric conversion coefficient between the input frame and the reference frame on the basis of each of the feature points on the input frame and the correspondence point on the reference frame for the feature point, the means for finding the correspondence point on the reference frame for each of the feature points converting the coordinates of the feature point on the input frame into coordinates on the reference frame using the indirect geometric conversion coefficient between the input frame and the reference frame, and tracking the correspondence point on the reference frame corresponding to the feature point on the input frame using an obtained coordinate point on the reference frame as an initial value, to find the correspondence point on the reference frame corresponding to the feature point on the input frame.

An example of the third means is one comprising means for finding a plurality of feature points from the reference frame, means for finding a correspondence point on the input frame for each of the feature points, and means for calculating a direct geometric conversion coefficient between the input frame and the reference frame on the basis of each of the feature points on the reference frame and the correspondence point on the input frame for the feature point, the means for finding the correspondence point on the input frame for each of the feature points converting the coordinates of the feature point on the reference frame into coordinates on the input frame using a coefficient obtained by subjecting the indirect geometric conversion coefficient between the input frame and the reference frame to inverse conversion, and tracking the correspondence point on the input frame corresponding to the feature point on the reference frame using an obtained coordinate point on the input frame as an initial value, to find the correspondence point on the input frame corresponding to the feature point on the reference frame.

In an automatic stabilization control method for carrying out automatic stabilization control of data representing a moving image within a range from a reference frame to a frame which is an arbitrary number of frames succeeding the reference frame, a first automatic stabilization control method according to the present invention is characterized by comprising a first step of calculating a geometric conversion coefficient between an input frame and a frame which is one frame preceding the input frame for converting coordinates on the input frame into coordinates on the frame which is one frame preceding the input frame as a geometric conversion coefficient between the adjacent frames; a second step of accumulating the geometric conversion coefficients between the adjacent frames from the reference frame to the input frame, to calculate an indirect geometric conversion coefficient between the input frame and the reference frame; a third step of calculating a direct geometric conversion coefficient between the input frame and the reference frame utilizing the indirect geometric conversion coefficient between the input frame and the reference frame; and a fourth step of carrying out automatic stabilization control of the input frame using the direct geometric conversion coefficient between the input frame and the reference frame.

An example of the third step is one comprising the steps of finding a plurality of feature points from the input frame, finding a correspondence point on the reference frame for each of the feature points, and calculating the direct geometric conversion coefficient between the input frame and the reference frame on the basis of each of the feature points on the input frame and the correspondence point on the reference frame for the feature point, the step of finding the correspondence point on the reference frame for each of the feature points comprising the step of converting the coordinates of the feature point on the input frame into coordinates on the reference frame using the indirect geometric conversion coefficient between the input frame and the reference frame, and tracking the correspondence point on the reference frame corresponding to the feature point on the input frame using an obtained coordinate point on the reference frame as an initial value, to find the correspondence point on the reference frame corresponding to the feature point on the input frame.

An example of the third step is one comprising the steps of finding a plurality of feature points from the reference frame, finding a correspondence point on the input frame for each of the feature points, and calculating the direct geometric conversion coefficient between the input frame and the reference frame on the basis of each of the feature points on the reference frame and the correspondence point on the input frame for the feature point, the step of finding the correspondence point on the input frame for each of the feature points comprising the step of converting the coordinates of the feature point on the reference frame into coordinates on the input frame using a coefficient obtained by subjecting the indirect geometric conversion coefficient between the input frame and the reference frame to inverse conversion, and tracking the correspondence point on the input frame corresponding to the feature point on the reference frame using an obtained coordinate point on the input frame as an initial value, to find the correspondence point on the input frame corresponding to the feature point on the reference frame.

In a computer readable recording medium having an automatic stabilization control program, for carrying out automatic stabilization control of data representing a moving image within a range from a reference frame to a frame which is an arbitrary number of frames succeeding the reference frame, recorded thereon, a first recording medium according to the present invention is characterized in that the automatic stabilization control program causes a computer to carry out a first step of calculating a geometric conversion coefficient between an input frame and a frame which is one frame preceding the input frame for converting coordinates on the input frame into coordinates on the frame which is one frame preceding the input frame as a geometric conversion coefficient between the adjacent frames; a second step of accumulating the geometric conversion coefficients between the adjacent frames from the reference frame to the input frame, to calculate an indirect geometric conversion coefficient between the input frame and the reference frame; a third step of calculating a direct geometric conversion coefficient between the input frame and the reference frame utilizing the indirect geometric conversion coefficient between the input frame and the reference frame; and a fourth step of carrying out automatic stabilization control of the input frame using the direct geometric conversion coefficient between the input frame and the reference frame.

An example of the third step is one comprising the steps of finding a plurality of feature points from the input frame, finding a correspondence point on the reference frame for each of the feature points, and calculating the direct geometric conversion coefficient between the input frame and the reference frame on the basis of each of the feature points on the input frame and the correspondence point on the reference frame for the feature point, the step of finding the correspondence point on the reference frame for each of the feature points comprising the step of converting the coordinates of the feature point on the input frame into coordinates on the reference frame using the indirect geometric conversion coefficient between the input frame and the reference frame, and tracking the correspondence point on the reference frame corresponding to the feature point on the input frame using an obtained coordinate point on the reference frame as an initial value, to find the correspondence point on the reference frame corresponding to the feature point on the input frame.

An example of the third step is one comprising the steps of finding a plurality of feature points from the reference frame, finding a correspondence point on the input frame for each of the feature points, and calculating the direct geometric conversion coefficient between the input frame and the reference frame on the basis of each of the feature points on the reference frame and the correspondence point on the input frame for the feature point, the step of finding the correspondence point on the input frame for each of the feature points comprising the step of converting the coordinates of the feature point on the reference frame into coordinates on the input frame using a coefficient obtained by subjecting the indirect geometric conversion coefficient between the input frame and the reference frame to inverse conversion, and tracking the correspondence point on the input frame corresponding to the feature point on the reference frame using an obtained coordinate point on the input frame as an initial value, to find the correspondence point on the input frame corresponding to the feature point on the reference frame.

In an automatic stabilization control apparatus that makes automatic stabilization control of data representing a moving image, a second automatic stabilization control apparatus according to the present invention is characterized by comprising first means for calculating for each of input frames a geometric conversion coefficient between a frame to be the basis of automatic stabilization control and the input frame; and second means for producing for each of the input frames an output frame, the second means comprising means for clearing an output frame memory, means for subjecting the input frame to geometric conversion on the basis of the geometric conversion coefficient, corresponding to the input frame, calculated by the first means, means for rendering a frame, after the geometric conversion, corresponding to the input frame in the output frame memory, and means for interpolating a non-rendering area within the output frame memory by at least one frame in the vicinity of the input frame.

In an automatic stabilization control method for carrying out automatic stabilization control of data representing a moving image, a second automatic stabilization control method according to the present invention is characterized by comprising a first step of calculating for each of input frames a geometric conversion coefficient between a frame to be the basis of automatic stabilization control and the input frame; and a second step of producing for each of the input frames an output frame, the second step comprising the steps of clearing an output frame memory, subjecting the input frame to geometric conversion on the basis of the geometric conversion coefficient, corresponding to the input frame, calculated in the first step, rendering a frame, after the geometric conversion, corresponding to the input frame in the output frame memory, and interpolating a non-rendering area within the output frame memory by at least one frame in the vicinity of the input frame.

In a computer readable recording medium having an automatic stabilization control program, for carrying out automatic stabilization control of data representing a moving image, recorded thereon, a second recording medium according to the present invention is characterized in that the automatic stabilization control program causes a computer to carry out a first step of calculating for each of input frames a geometric conversion coefficient between a frame to be the basis of automatic stabilization control and the input frame; and a second step of producing for each of the input frames an output frame, the second step comprising the steps of clearing an output frame memory, subjecting the input frame to geometric conversion on the basis of the geometric conversion coefficient, corresponding to the input frame, calculated in the first step, rendering a frame, after the geometric conversion, corresponding to the input frame in the output frame memory, and interpolating a non-rendering area within the output frame memory by at least one frame in the vicinity of the input frame.

In an automatic stabilization control apparatus that makes automatic stabilization control of data representing a moving image, a third automatic stabilization control apparatus according to the present invention is characterized by comprising first means for calculating for each of input frames a geometric conversion coefficient between a frame to be the basis of automatic stabilization control and the input frame; and second means for subjecting for each of the input frames the input frame to geometric conversion on the basis of the geometric conversion coefficient, corresponding to the input frame, calculated by the first means, and then rendering a frame, after the geometric conversion, corresponding to the input frame in the output frame memory; and third means for holding the results of the rendering by the second means, the second means overwriting, in rendering frames, after the geometric conversion, corresponding to the second and the subsequent input frames in the output frame memory, the frames after the geometric conversion corresponding to the input frames on the results of the rendering so far performed.

In an automatic stabilization control method for carrying out automatic stabilization control of data representing a moving image, a third automatic stabilization control method according to the present invention is characterized by comprising a first step of calculating for each of input frames a geometric conversion coefficient between a frame to be the basis of automatic stabilization control and the input frame; a second step of subjecting for each of the input frames the input frame to geometric conversion on the basis of the geometric conversion coefficient, corresponding to the input frame, calculated in the first step, and then rendering a frame, after the geometric conversion, corresponding to the input frame in the output frame memory; and a third step of holding the results of the rendering in the second step, the second step comprising the step of overwriting, in rendering frames, after the geometric conversion, corresponding to the second and the subsequent input frames in the output frame memory, the frames after the geometric conversion corresponding to the input frames on the results of the rendering so far performed.

In a computer readable recording medium having an automatic stabilization control program, for carrying out automatic stabilization control of data representing a moving image, recorded thereon, a third recording medium according to the present invention is characterized in that the automatic stabilization control program causes a computer to carry out a first step of calculating for each of input frames a geometric conversion coefficient between a frame to be the basis of automatic stabilization control and the input frame; a second step of subjecting for each of the input frames the input frame to geometric conversion on the basis of the geometric conversion coefficient, corresponding to the input frame, calculated in the first step, and then rendering a frame, after the geometric conversion, corresponding to the input frame in the output frame memory; and a third step of holding the results of the rendering in the second step, the second step comprising the step of overwriting, in rendering frames, after the geometric conversion, corresponding to the second and the subsequent input frames in the output frame memory, the frames after the geometric conversion corresponding to the input frames on the results of the rendering so far performed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described.

[1] Description of Automatic Stabilization Control Apparatus

Figure 1:
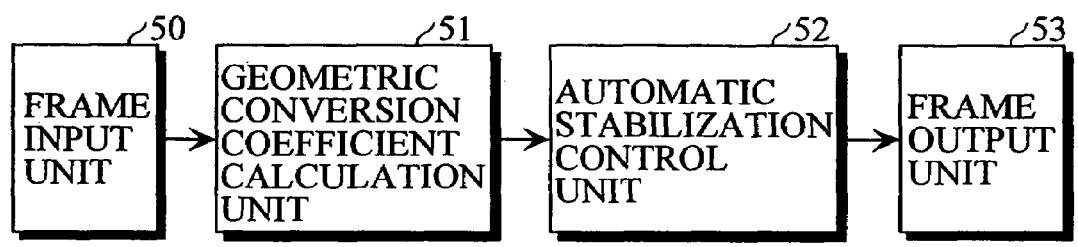
FIG. 1 is a block diagram showing the configuration of a conventional automatic stabilization control apparatus.
Figure 2:
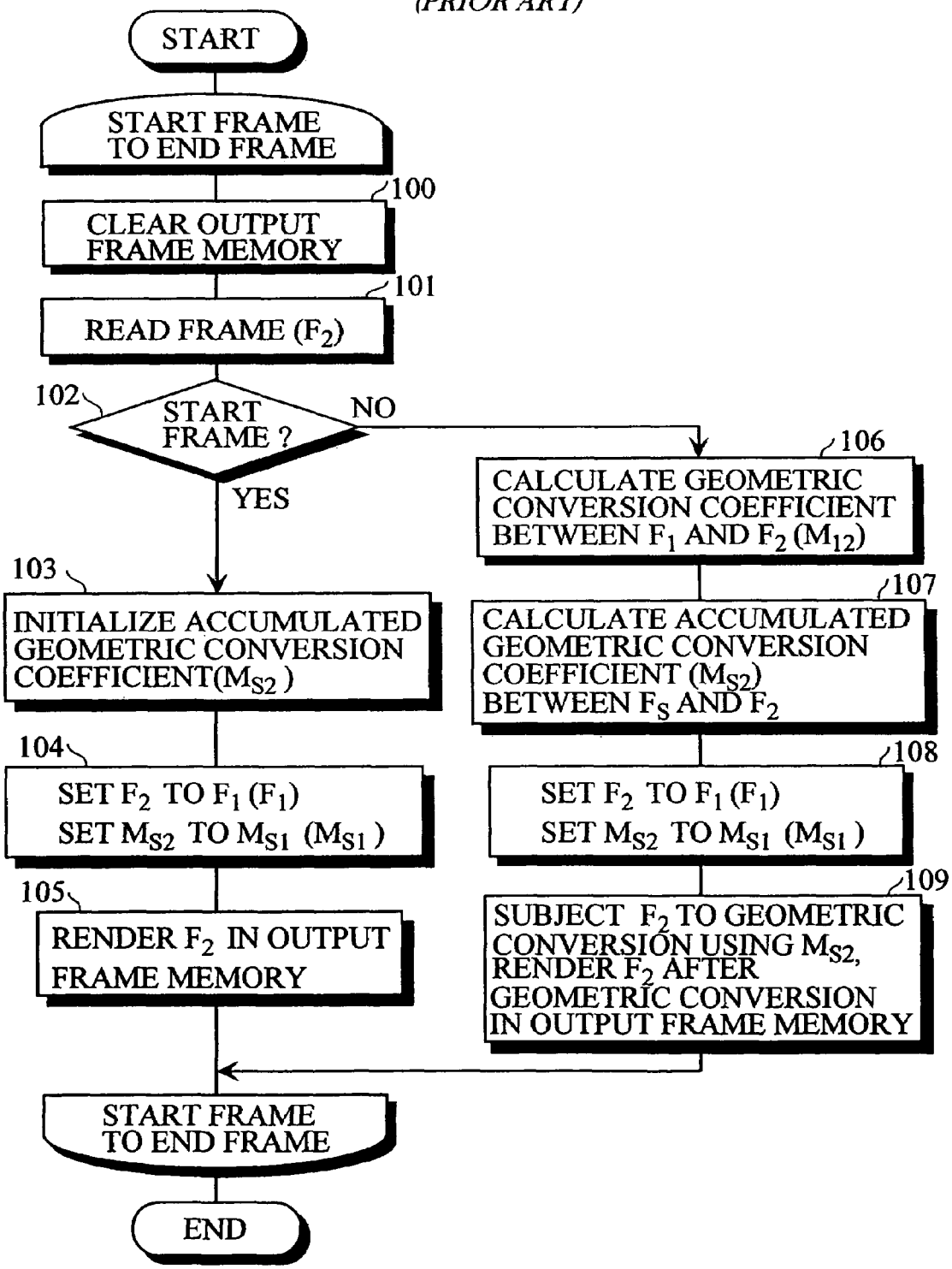
FIG. 2 is a flow chart showing the procedure for automatic stabilization control processing performed by a conventional method.
Figure 3:
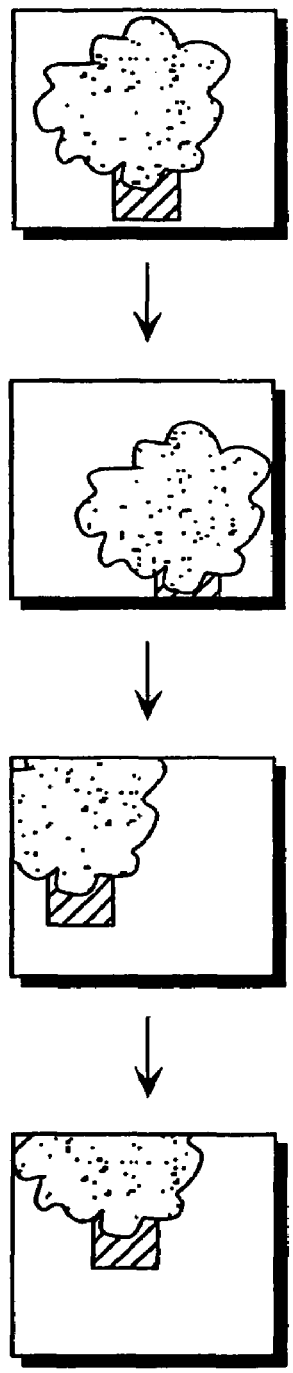
FIG. 3 is a schematic view showing frames picked up in a state where hands move.
Figure 4:
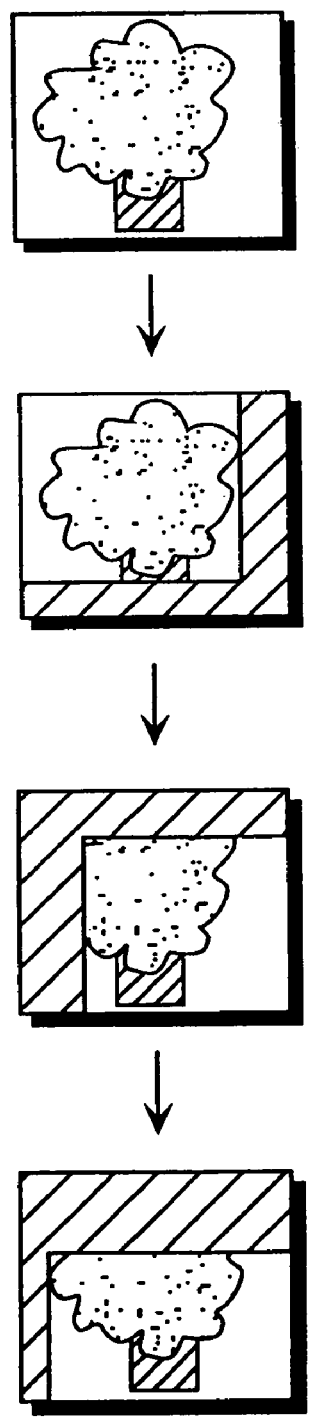
FIG. 4 is a schematic view showing frames obtained by rendering data after geometric conversion representing the frames shown in FIG. 3 in an output frame memory.
Figure 5:
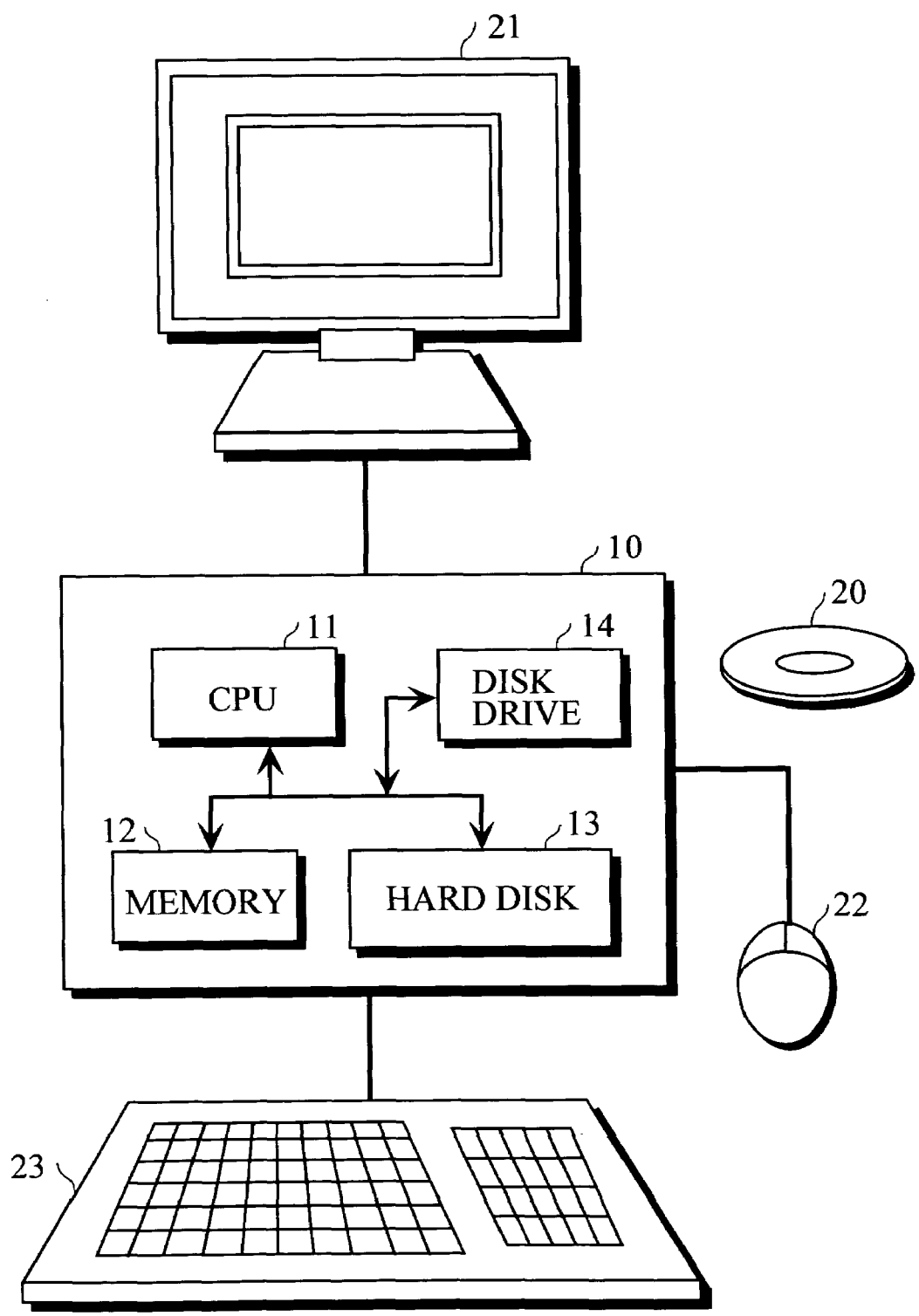
FIG. 5 is a block diagram showing the configuration of an automatic stabilization control apparatus.

FIG. 5 illustrates the configuration of an automatic stabilization control apparatus.

The automatic stabilization control apparatus is realized by a personal computer (PC) 10. A display 21, a mouse 22, and a keyboard 23 are connected to the PC 10. The PC 10 comprises a CPU 11, a memory 12, a hard disk 13, and a drive of a removable disk such as a CD-ROM 14 (a disk drive).

The hard disk 13 stores an automatic stabilization control program in addition to an OS (Operation System) or the like. The automatic stabilization control program is installed in the hard disk 13 using a CD-ROM 20 storing the program. The hard disk 13 previously stores a moving image file picked up by a video camera or the like.

[2] Description of Automatic Stabilization Control Processing Performed by CPU in Case where Automatic Stabilization Control Program is Started Examples of automatic stabilization control processing include geometric conversion coefficient calculation processing and output frame production processing. First, the output frame production processing is performed after the geometric conversion coefficient calculation processing is performed.

In the present embodiment, a user is caused to previously set judgment whether or not a non-rendering area in an output frame memory is subjected to interpolation processing. In a case where such setting as to subject the non-rendering area to interpolation processing is performed, there occurs a state where a flag storing the fact (hereinafter referred to as a flag for judging whether or not interpolation is required) flag is set (flag=1). On the other hand, in a case where such setting as to subject the non-rendering area to interpolation processing is not performed, there occurs a state where the flag for judging whether or not interpolation is required flag is reset (flag=0).

In the automatic stabilization control processing, the first frame (a start frame) in a range where automatic stabilization control is carried out is used as a reference frame, to carry out automatic stabilization control of the other frame in the range where automatic stabilization control is carried out. The range in which automatic stabilization control is carried out can be arbitrarily set.

Figure 6:
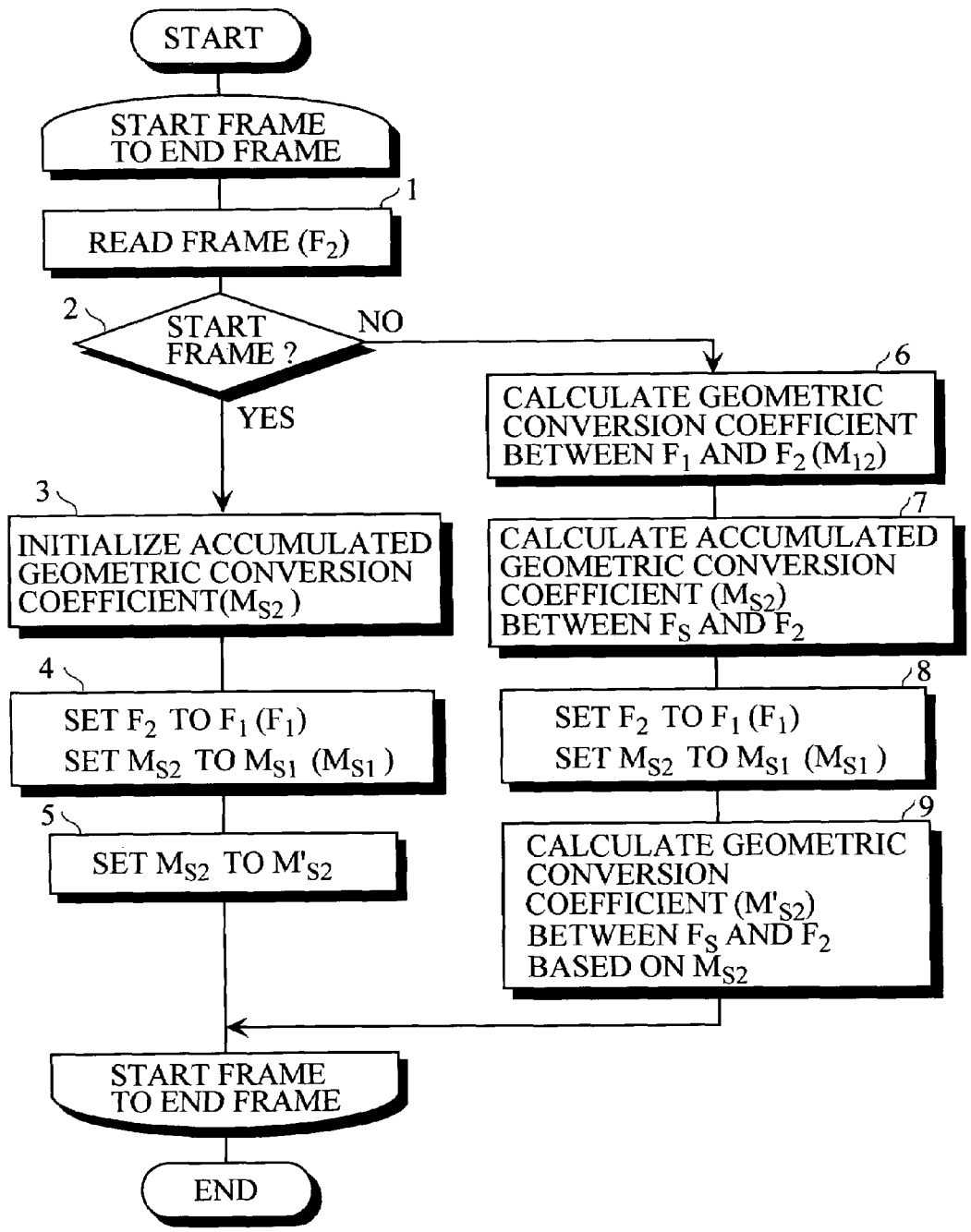
FIG. 6 is a flow chart showing the procedure for geometric conversion coefficient calculation processing.

FIG. 6 shows the procedure for geometric conversion coefficient calculation processing.

Let $F_S$ be a start frame (a reference frame) in the range where automatic stabilization control is carried out, $F_2$ be the current input frame in the range where automatic stabilization control is carried out, $F_1$ be an input frame which is one frame preceding the current input frame $F_2$, $M_{12}$ be a geometric conversion coefficient between the frames $F_1$ and $F_2$ (a geometric conversion coefficient for converting coordinates on the frame $F_2$ into coordinates on the frame $F_1$) $M_{S1}$ be a geometric conversion coefficient between the frames $F_S$ and $F_1$, and $M_{S2}$ be an accumulated geometric conversion coefficient between the frames $F_S$ and $F_2$ (an accumulated geometric conversion coefficient for converting coordinates on the frame $F_2$ into coordinates on the frame $F_S$).

Each of the frames from the start frame to the end frame in the range where automatic stabilization control is carried out is subjected to the following processing: That is, the frame is first read onto a memory, and the read frame (input frame) is taken as $F_2$ (step 1).

It is then judged whether or not the input frame $F_2$ is the start frame $F_S$ (step 2). When it is judged that the input frame $F_2$ is the start frame $F_S$, a coefficient (an initial value) representing non-conversion expressed by the following equation (5) is set as the accumulated geometric conversion coefficient $M_{S2}$ between the start frame $F_S$ and the input frame $F_2$ (step 3).

$$M = \begin{pmatrix} 1 & 0 & 0 \\ 0 & 1 & 0 \\ 0 & 0 & 1 \end{pmatrix} \quad (5)$$

The input frame $F_2$ is set as the preceding input frame $F_1$, and $M_{S2}$ is set as the geometric conversion coefficient $M_{S1}$ between the start frame $F_S$ and the preceding input frame $F_1$ (step 4). Further, $M_{S2}$ is set as a direct geometric conversion coefficient $M'_{S2}$ between the start frame $F_S$ and the input frame $F_2$ (step 5). Thereafter, the procedure is returned to the step 1. In the step 1, the succeeding frame is read.

When it is judged in the foregoing step 2 that the input frame $F_2$ is not the start frame $F_S$, the geometric conversion coefficient $M_{12}$ between the preceding frame $F_1$ and the current frame $F_2$ is calculated (step 6). The accumulated geometric conversion coefficient $M_{S2}$ between the start frame $F_S$ and the current frame $F_2$ is then calculated from $M_{S1}$ and $M_{12}$, as expressed by the following equation (6) (step 7).

$$M_{S2} = M_{12} M_{S1} \quad (6)$$

The input frame $F_2$ is set as the preceding input frame $F_1$, and $M_{S2}$ is set as the geometric conversion coefficient $M_{S1}$ between the start frame $F_S$ and the preceding input frame $F_1$ (step 8).

The direct geometric conversion coefficient $M'_{S2}$ between the start frame $F_S$ and the input frame $F_2$ is then calculated on the basis of the accumulated geometric conversion coefficient $M_{S2}$ calculated in the foregoing step 7 (step 9). The details of the processing will be described later. Thereafter, the procedure is returned to the step 1. In the step 1, the succeeding frame is read. The foregoing processing is repeatedly performed up to the final frame.

Figure 7:
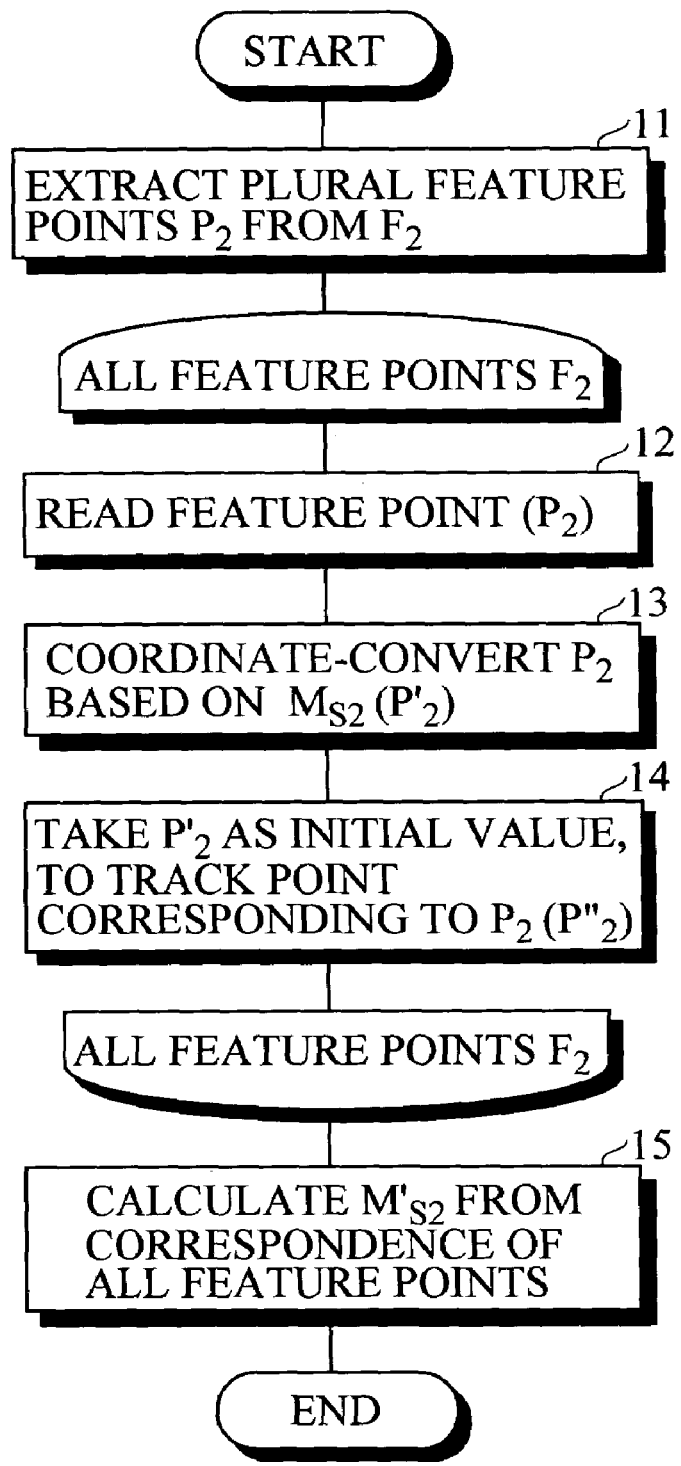
FIG. 7 is a flow chart showing the detailed procedure for the processing in the step 9 shown in FIG. 6.

FIG. 7 shows the detailed procedure for the processing in the step 9 shown in FIG. 6.

First, a plurality of feature points $P_2$ are extracted from the input frame $F_2$ (step 11). The feature point is a point at which a pixel value between adjacent pixels is rapidly changed. Processing in the steps 12 to 14 is performed for each of the feature points.

The one feature point $P_2$ is read (step 12). The feature point $P_2$ is coordinate-converted into a point on the start frame $F_S$ on the basis of the accumulated geometric conversion coefficient $M_{S2}$, and the point is taken as $P'_2$ (step 13). The point $P'_2$ is taken as an initial value for retrieval (a retrieval start point), to track a feature point on the start frame $F_S$ corresponding to the point $P_2$, and an obtained point is taken as $P''_2$ (step 14).

Here, the feature point is tracked using optical flow estimation by a gradient method. The optical flow estimation is based on the premise of the movement of an object in a local area. When there is a great camera movement between the start frame $F_S$ and the input frame $F_2$, therefore, the motion of the feature point cannot be accurately detected. $P'_2$ obtained by coordinate-converting the feature point $P_2$ on the input frame $F_2$ using the accumulated geometric conversion coefficient $M_{S2}$, as described above, is taken as an initial value for tracking on the start frame $F_S$. Even if there is a great camera movement between the start frame $F_S$ and the input frame $F_2$, therefore, it is assumed that the movement is a very small movement, thereby making it possible to accurately detect the motion of the feature point.

The processing in the foregoing steps 12 to 14 is performed with respect to all the feature points extracted in the step 11, thereby obtaining the results of correspondence of all the feature points between the frames. As described above, two equations are respectively derived from correspondence points, to calculate a geometric conversion coefficient with six unknowns from all the equations using a linear solution (step 15). The calculated geometric conversion coefficient is taken as $M'_{S2}$.

Figure 8:
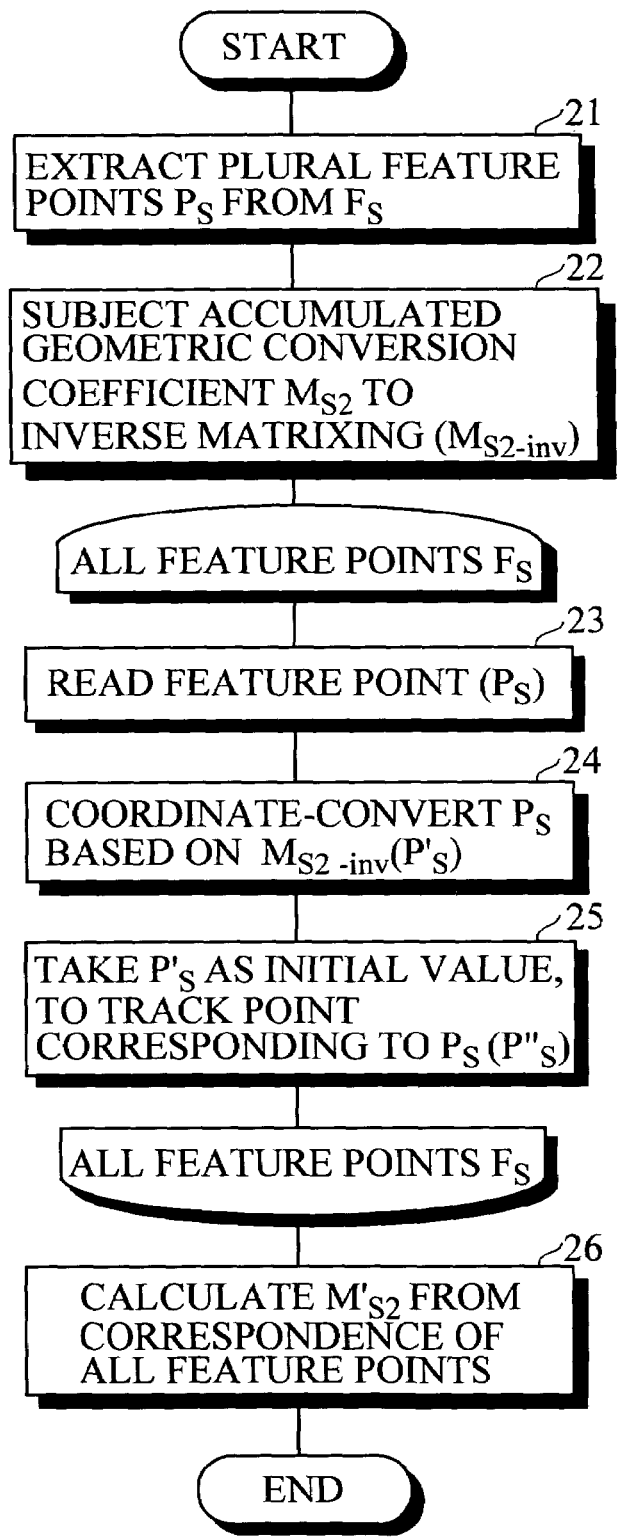
FIG. 8 is a flow chart showing another example of the procedure for the processing in the step 9 shown in FIG. 6.

FIG. 8 shows another example of the procedure for processing in the step 9 shown in FIG. 6.

First, a plurality of feature points $P_S$ are extracted from the start frame $F_S$ (step 21). The feature point is a point at which a pixel value between adjacent pixels is rapidly changed. The accumulated geometric conversion coefficient $M_{S2}$ is then subjected to inverse conversion (inverse matrixing), to find a coefficient $M_{S2\text{-}inv}$ (step 22). Processing in the steps 23 to 25 is performed for each of the feature points.

The one feature point $P_S$ is read (step 3). The feature point $P_S$ is coordinate-converted into a point on the input frame $F_2$ on the basis of the coefficient $M_{S2\text{-}inv}$, to take the point as $P'_S$ (step 24). The point $P'_S$ is taken as an initial value for retrieval (a retrieval start point), to track a feature point on the input frame $F_2$ corresponding to the point $P_S$. An obtained point is taken as $P''_S$ (step 25).

Here, the feature point is tracked using optical flow estimation by a gradient method. The optical flow estimation is based on the premise of the movement of an object in a local area. When there is a great camera movement between the start frame $F_S$ and the input frame $F_2$, therefore, the motion of the feature point cannot be accurately detected. $P'_S$ obtained by coordinate-converting the feature point $P_S$ on the start frame $F_S$ using the coefficient $M_{S2\text{-}inv}$ obtained by subjecting the accumulated geometric conversion coefficient $M_{S2}$ to inverse conversion, as described above, is taken as an initial value for tracking on the input frame $F_2$. Even if there is a great camera movement between the start frame $F_S$ and the input frame $F_2$, therefore, it is assumed that the movement is a very small movement, thereby making it possible to accurately detect the motion of the feature point.

The processing in the foregoing steps 23 to 25 is performed with respect to all the feature points extracted in the step 21, thereby obtaining the results of correspondence of all the feature points between the frames. As described above, two equations are respectively derived from correspondence points, to calculate a geometric conversion coefficient with six unknowns from all the equations using a linear solution (step 26). The calculated geometric conversion coefficient is taken as $M'_{S2}$.

Figure 9:
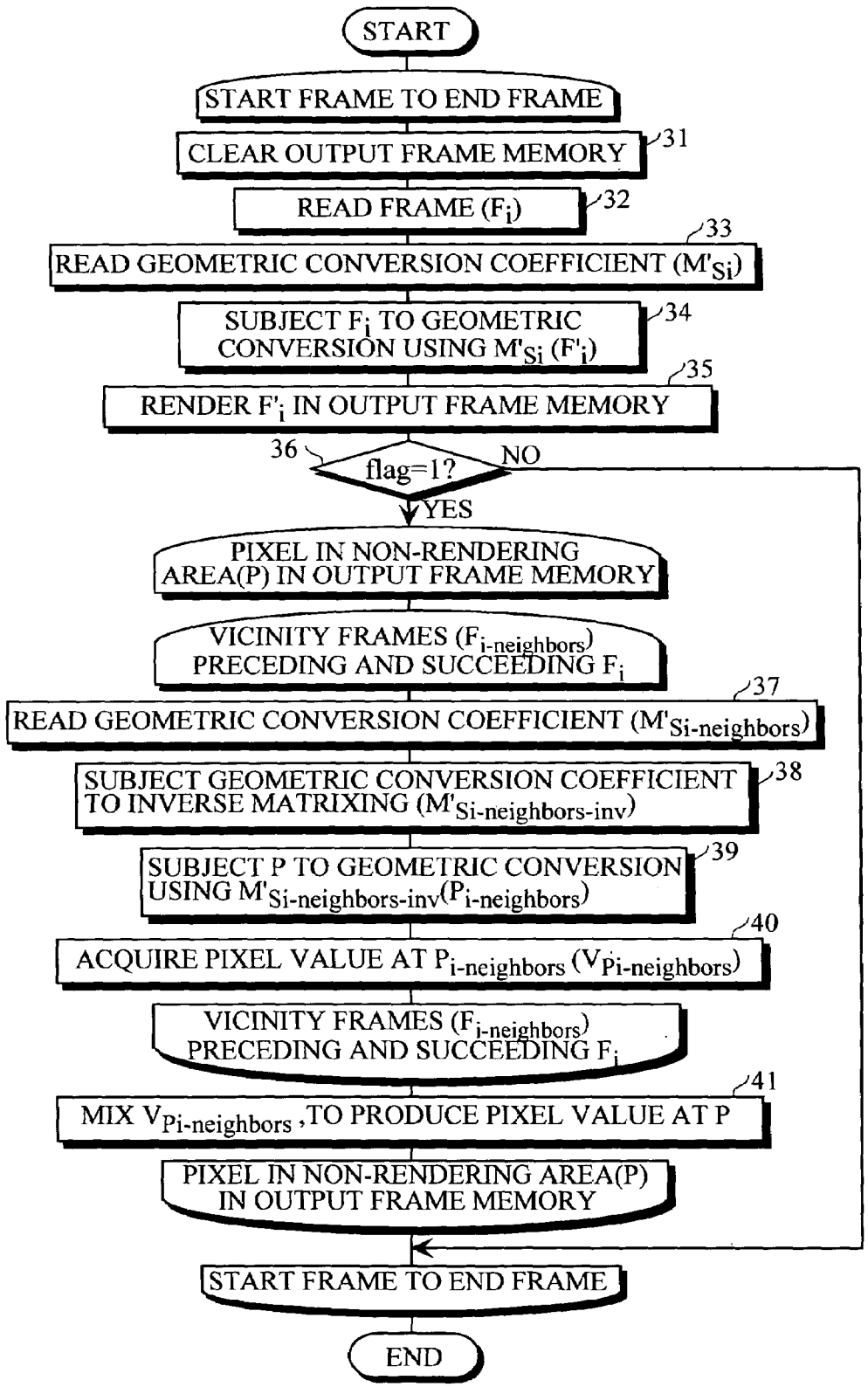
FIG. 9 is a flow chart showing the procedure for output frame production processing.

FIG. 9 shows the procedure for output frame production processing which is performed after the geometric conversion coefficients $M'_{S2}$ corresponding to all the frames are calculated.

The direct geometric conversion coefficient $M'_{S2}$ between the start frame $F_S$ and each of the input frames $F_2$, which is calculated by the above-mentioned geometric conversion coefficient calculation processing shown in FIG. 6, described above, is represented by $M'_{Si}$ (i=1, 2, ... ).

Each of the frames from the start frame to the end frame is subjected to the following processing: That is, an output frame memory is first cleared (step 31). Thereafter, an object frame $F_i$ is read in the memory (step 32). A geometric conversion coefficient $M'_{Si}$ corresponding to the object frame $F_i$ is then read (step 33). A frame $F'_i$ obtained by subjecting the object frame $F_i$ to geometric conversion using the geometric conversion coefficient $M'_{Si}$ corresponding thereto is then produced (step 34), and a frame $F'_i$ after the geometric conversion is rendered in the output frame memory (step 35).

It is then judged whether or not the flag for judging whether or not interpolation is required flag is set (flag=1) (step 36). When the flag for judging whether or not interpolation is required flag is not set (flag=0), interpolation processing for each pixel within a non-rendering area of the output frame memory (steps 37 to 41) is not performed. Therefore, each of the frames from the start frame and the end frame is subjected to the processing in the foregoing steps 31 to 35.

When the flag for judging whether or not interpolation is required flag is set, the interpolation processing is performed for each pixel within the non-rendering area of the output frame memory (steps 37 to 41). Description is made of the interpolation processing for a pixel at a point P in the non-rendering area.

10 frames preceding and succeeding the object frame $F_i$ are extracted as vicinity frames $F_{i-neighbors}$. When the number of vicinity frames preceding and succeeding the object frame $F_i$ is no more than 10, only the restricted vicinity frames are extracted. The following processing is performed for each of the vicinity frames $F_{i-neighbors}$.

That is, a geometric conversion coefficient $M'_{Si-neighbors}$ corresponding to the vicinity frame $F_{i-neighbors}$ is read onto the memory (step 37). A coefficient $M'_{Si-neighbors-inv}$ obtained by subjecting $M'_{Si-neighbors}$ to inverse conversion (inverse matrixing) is then found (step 38). Here, $M'_{Si-neighbors-inv}$ corresponds to a geometric conversion coefficient for coordinate-converting a point on the start frame into a point on the vicinity frame.

A point obtained by subjecting the point P to geometric conversion using $M'_{Si-neighbors-inv}$ is taken as $P_{i-neighbors}$ (step 39) and a pixel value corresponding to the point $P_{i-neighbors}$ on the vicinity frame is acquired (step 40). The acquired pixel value is taken as $V_{Pi-neighbors}$. Each of the vicinity frames $F_{i-neighbors}$ is subjected to such processing (steps 37 to 40).

Pixel values $V_{Pi-neighbors}$ corresponding to the points P respectively obtained from the vicinity frames $F_{i-neighbors}$ are mixed, to produce the pixel value corresponding to the point P (step 41).

When the point $P_{i-neighbors}$ obtained by subjecting the point P to geometric conversion using $M'_{Si-neighbors-inv}$ does not exist on the vicinity frames, the pixel values in the vicinity frames are not mixed. When there are no vicinity frames usable for interpolation, the interpolation is performed using a pixel value in the start frame.

The ratio of mixture of the pixel values $V_{Pi-neighbors}$ corresponding to the points P respectively obtained from the vicinity frames $F_{i-neighbors}$ is determined in the following manner.

Figure 10:
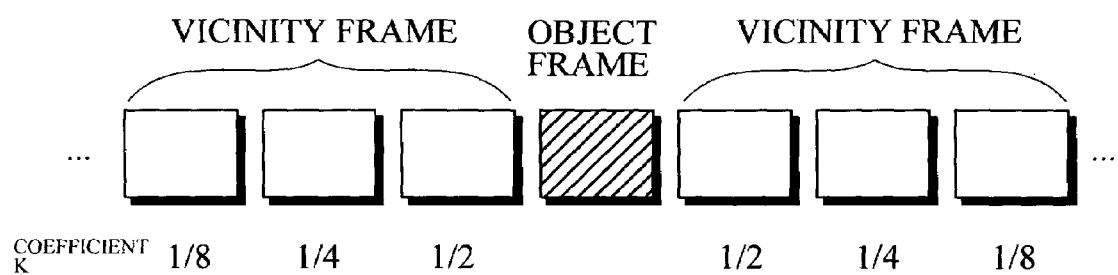
FIG. 10 is a schematic view for explaining a method of calculating a mixture ratio for vicinity frames.

First, the vicinity frames are previously given coefficients K such as $½^n$ in the order of increasing distance from the object frame, as shown in FIG. 10. n is the number of frames between the frame to be corrected and the vicinity frame.

The coefficients given to vicinity frames usable for interpolation at the point P in the non-rendering area are totalized ($K_{total}$). An inverse number ($1/K_{total}$) of the total is calculated, and $1/K_{total}$ is added to the coefficient K given to each of the vicinity frames. This is a mixture ratio for each of the vicinity frames.

When the vicinity frames usable for interpolation at the point P in the non-rendering area are one of the vicinity frames given K=⅛ and one of the vicinity frames given K=½, the total $K_{total}$ of the coefficients given to the vicinity frames is ⅝. The inverse number of the total is 8/5. The mixture ratio for the vicinity frames given to K=⅛ is (⅛)×(8/5)=⅕, and the mixture ratio for the vicinity frames given to K=½ is (½)×(8/5)=⅘.

The mixture ratios for the vicinity frames usable for interpolation are thus found, so that the closer in time the vicinity frame is to the object frame, the higher the mixture ratio is for the vicinity frame, and the sum of the mixture ratios for the vicinity frames is one. The interpolation processing at the point P is performed with respect to all the points in the non-rendering area, to complete an output frame.

According to the above-mentioned embodiment, even if calculation of the geometric conversion coefficient ends in failure in the intermediate frame, the failure does not affect correction processing of the succeeding frames, thereby allowing high-precision automatic stabilization control to be performed. Further, the output frame after the automatic stabilization control does not include data other than image pick-up data, thereby making it possible to ensure a field of view which is not less than a field of view ensured by the input frame.

When the necessity of interpolating the non-rendering area is eliminated, the output frame memory may be cleared before the step 1 shown in FIG. 6, the frame $F_2$ may be subjected to geometric conversion using $M_{S2}$ in the step 5 shown in FIG. 6, to render data after the geometric conversion in the output frame memory, the geometric conversion coefficient $M'_{S2}$ may be calculated in the step 9 shown in FIG. 6, and the frame $F_2$ may be subjected to geometric conversion using $M'_{S2}$, to render data after the geometric conversion in the output frame memory.

[3] Description of Modified Example of Output Frame Production Processing

Description is made of a modified example of output frame production processing.

Figure 11:
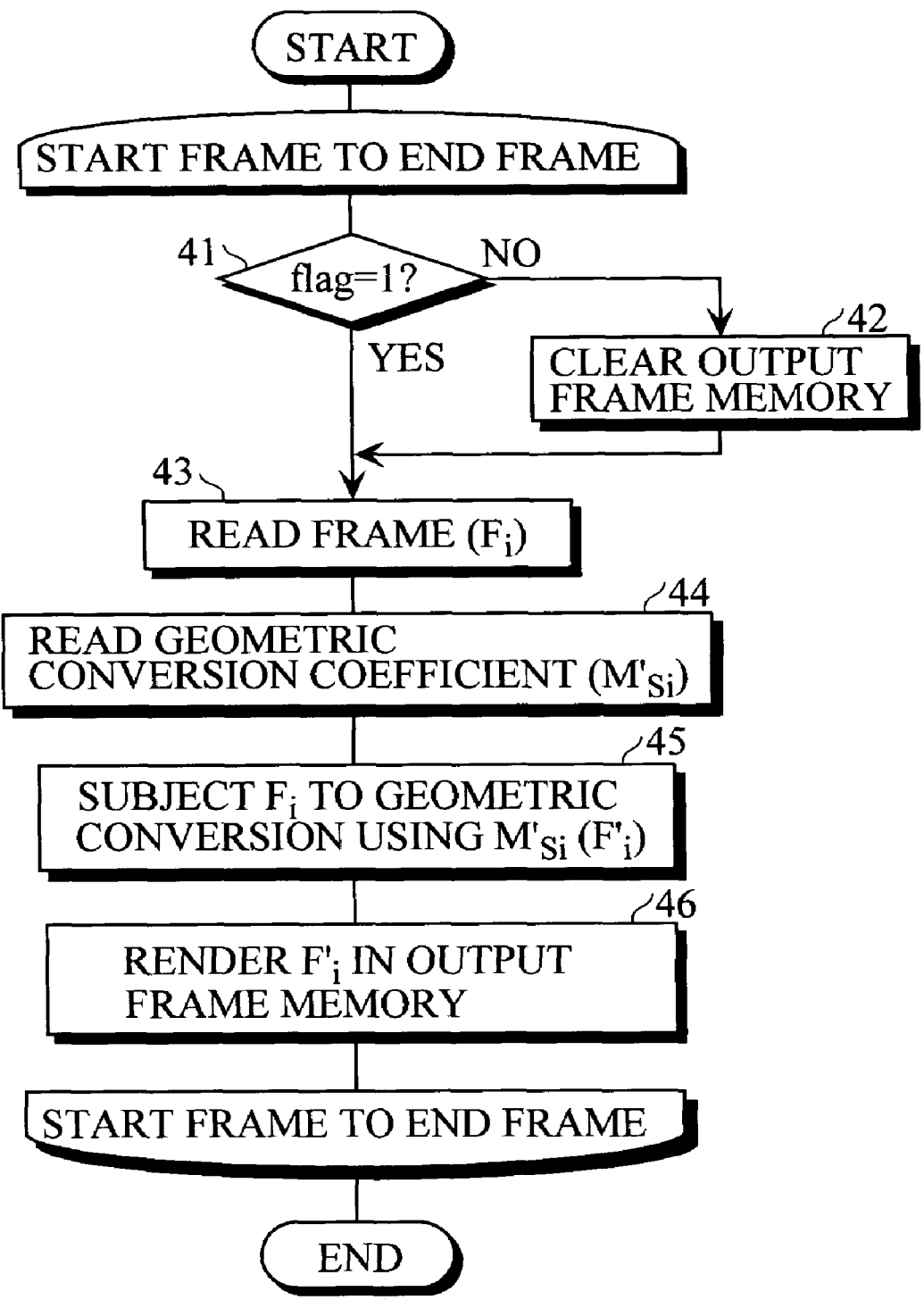
FIG. 11 is a flow chart showing another example of the procedure for output frame production processing.

FIG. 11 shows another example of the procedure for output frame production processing which is performed after the geometric conversion coefficients $M'_{S2}$ corresponding to all frames are calculated.

The direct geometric conversion coefficient $M'_{S2}$ between the start frame $F_S$ and each of the input frames $F_2$, which is calculated by the above-mentioned geometric conversion coefficient calculation processing shown in FIG. 6, is represented by $M'_{Si}$ (i=1, 2, . . . ).

Each of the frames from the start frame to the end frame is subjected to the following processing: That is, it is first judged whether or not the flag for judging whether or not interpolation is required flag is set (flag=1) (step 41). When the flag for judging whether or not interpolation is required flag is not set (flag=0), the output frame memory is cleared (step 42). Thereafter, the program proceeds to the step 43. When the flag for judging whether or not interpolation is required flag is set (flag=1), the program proceeds to the step 43 without clearing the output frame memory.

In the step 43, an object frame $F_i$ is read in the memory. A geometric conversion coefficient $M'_{Si}$ corresponding to the object frame $F_i$ is then read (step 44). A frame $F'_i$ obtained by subjecting the object frame $F_i$ to geometric conversion using the geometric conversion coefficient $M'_{Si}$ corresponding thereto is then produced (step 45), and the frame $F'_i$ after the geometric conversion is rendered in the output frame memory (step 46). The foregoing processing in the steps 41 to 46 is repeatedly performed up to the final frame.

In the output frame production processing, when the flag for judging whether or not interpolation is required flag is set, the output frame memory is not cleared for each of input frames. In the output frame memory, therefore, the results of automatic stabilization control of each of the input frames are overwritten on the results of automatic stabilization control of the past frame. The start frame is not subjected to geometric conversion. After the start frame is rendered in the output frame memory, therefore, an area corresponding to at least the size of the start frame is an area where rendering has already been performed on the output frame memory.

When the results of automatic stabilization control of each of the input frames are rendered in the output frame memory, an area other than an area where the results of automatic stabilization control are rendered enters a state where the area is interpolated by the results of automatic stabilization control of the past frame. According to this method, in the output frame, the same field of view (angle of field) as that ensured by the input frame can be ensured. When there is no moving object at the periphery of the input frame, a joint between the results of automatic stabilization control of the past frame and the results of automatic stabilization control of the current frame is not relatively conspicuous, thereby obtaining the results of automatic stabilization control having no incompatible feeling.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an automatic stabilization control apparatus that makes automatic stabilization control of data representing a moving image within a range from a reference frame to a frame which is an arbitrary number of frames succeeding the reference frame, an automatic stabilization control apparatus comprising:

first means for calculating a geometric conversion coefficient between an input frame and a frame which is one frame preceding the input frame for converting coordinates on the input frame into coordinates on the frame which is one frame preceding the input frame as a geometric conversion coefficient between the adjacent frames;

second means for accumulating the geometric conversion coefficients between the adjacent frames from the reference frame to the input frame, to calculate an indirect geometric conversion coefficient between the input frame and the reference frame;

third means for calculating a direct geometric conversion coefficient between the input frame and the reference frame utilizing the indirect geometric conversion coefficient between the input frame and the reference frame; and fourth means for carrying out automatic stabilization control of the input frame using the direct geometric conversion coefficient between the input frame and the reference frame.

2. The automatic stabilization control apparatus according to claim 1, wherein the third means comprises means for finding a plurality of feature points from the input frame, means for finding a correspondence point on the reference frame for each of the feature points, and means for calculating the direct geometric conversion coefficient between the input frame and the reference frame on the basis of each of the feature points on the input frame and the correspondence point on the reference frame for the feature point, the means for finding the correspondence point on the reference frame for each of the feature points converting the coordinates of the feature point on the input frame into coordinates on the reference frame using the indirect geometric conversion coefficient between the input frame and the reference frame, and tracking the correspondence point on the reference frame corresponding to the feature point on the input frame using an obtained coordinate point on the reference frame as an initial value, to find the correspondence point on the reference frame corresponding to the feature point on the input frame.

3. The automatic stabilization control apparatus according to claim 1, wherein the third means comprises means for finding a plurality of feature points from the reference frame, means for finding a correspondence point on the input frame for each of the feature points, and means for calculating a direct geometric conversion coefficient between the input frame and the reference frame on the basis of each of the feature points on the reference frame and the correspondence point on the input frame for the feature point, the means for finding the correspondence point on the input frame for each of the feature points converting the coordinates of the feature point on the reference frame into coordinates on the input frame using a coefficient obtained by subjecting the indirect geometric conversion coefficient between the input frame and the reference frame to inverse conversion, and tracking the correspondence point on the input frame corresponding to the feature point on the reference frame using an obtained coordinate point on the input frame as an initial value, to find the correspondence point on the input frame corresponding to the feature point on the reference frame.

4. In an automatic stabilization control method for carrying out automatic stabilization control of data representing a moving image within a range from a reference frame to a frame which is an arbitrary number of frames succeeding the reference frame, an automatic stabilization control method comprising:

a first step of calculating a geometric conversion coefficient between an input frame and a frame which is one frame preceding the input frame for converting coordinates on the input frame into coordinates on the frame which is one frame preceding the input frame as a geometric conversion coefficient between the adjacent frames;

a second step of accumulating the geometric conversion coefficients between the adjacent frames from the reference frame to the input frame, to calculate an indirect geometric conversion coefficient between the input frame and the reference frame;

a third step of calculating a direct geometric conversion coefficient between the input frame and the reference frame utilizing the indirect geometric conversion coefficient between the input frame and the reference frame; and a fourth step of carrying out automatic stabilization control of the input frame using the direct geometric conversion coefficient between the input frame and the reference frame.

5. The automatic stabilization control method according to claim 4, wherein the third step comprises the steps of finding a plurality of feature points from the input frame, finding a correspondence point on the reference frame for each of the feature points, and calculating the direct geometric conversion coefficient between the input frame and the reference frame on the basis of each of the feature points on the input frame and the correspondence point on the reference frame for the feature point, the step of finding the correspondence point on the reference frame for each of the feature points comprising the step of converting the coordinates of the feature point on the input frame into coordinates on the reference frame using the indirect geometric conversion coefficient between the input frame and the reference frame, and tracking the correspondence point on the reference frame corresponding to the feature point on the input frame using an obtained coordinate point on the reference frame as an initial value, to find the correspondence point on the reference frame corresponding to the feature point on the input frame.

6. The automatic stabilization control method according to claim 4, wherein the third step comprises the steps of finding a plurality of feature points from the reference frame, finding a correspondence point on the input frame for each of the feature points, and calculating the direct geometric conversion coefficient between the input frame and the reference frame on the basis of each of the feature points on the reference frame and the correspondence point on the input frame for the feature point, the step of finding the correspondence point on the input frame for each of the feature points comprising the step of converting the coordinates of the feature point on the reference frame into coordinates on the input frame using a coefficient obtained by subjecting the indirect geometric conversion coefficient between the input frame and the reference frame to inverse conversion, and tracking the correspondence point on the input frame corresponding to the feature point on the reference frame using an obtained coordinate point on the input frame as an initial value, to find the correspondence point on the input frame corresponding to the feature point on the reference frame.

7. In a computer readable recording medium having an automatic stabilization control program, for carrying out automatic stabilization control of data representing a moving image within a range from a reference frame to a frame which is an arbitrary number of frames succeeding the reference frame, recorded thereon, a computer readable recording medium wherein the automatic stabilization control program causes a computer to carry out:

a first step of calculating a geometric conversion coefficient between an input frame and a frame which is one frame preceding the input frame for converting coordinates on the input frame into coordinates on the frame which is one frame preceding the input frame as a geometric conversion coefficient between the adjacent frames;

a second step of accumulating the geometric conversion coefficients between the adjacent frames from the reference frame to the input frame, to calculate an indirect geometric conversion coefficient between the input frame and the reference frame;

a third step of calculating a direct geometric conversion coefficient between the input frame and the reference frame utilizing the indirect geometric conversion coefficient between the input frame and the reference frame; and a fourth step of carrying out automatic stabilization control of the input frame using the direct geometric conversion coefficient between the input frame and the reference frame.

8. The computer readable recording medium having the automatic stabilization control program recorded thereon according to claim 7, wherein the third step comprises the steps of finding a plurality of feature points from the input frame, finding a correspondence point on the reference frame for each of the feature points, and calculating the direct geometric conversion coefficient between the input frame and the reference frame on the basis of each of the feature points on the input frame and the correspondence point on the reference frame for the feature point, the step of finding the correspondence point on the reference frame for each of the feature points comprising the step of converting the coordinates of the feature point on the input frame into coordinates on the reference frame using the indirect geometric conversion coefficient between the input frame and the reference frame, and tracking the correspondence point on the reference frame corresponding to the feature point on the input frame using an obtained coordinate point on the reference frame as an initial value, to find the correspondence point on the reference frame corresponding to the feature point on the input frame.

9. The computer readable recording medium having an automatic stabilization control program recorded thereon according to claim 7, wherein the third step comprises the steps of finding a plurality of feature points from the reference frame, finding a correspondence point on the input frame for each of the feature points, and calculating the direct geometric conversion coefficient between the input frame and the reference frame on the basis of each of the feature points on the reference frame and the correspondence point on the input frame for the feature point, the step of finding the correspondence point on the input frame for each of the feature points comprising the step of converting the coordinates of the feature point on the reference frame into coordinates on the input frame using a coefficient obtained by subjecting the indirect geometric conversion coefficient between the input frame and the reference frame to inverse conversion, and tracking the correspondence point on the input frame corresponding to the feature point on the reference frame using an obtained coordinate point on the input frame as an initial value, to find the correspondence point on the input frame corresponding to the feature point on the reference frame.

* * * * *